United States Patent
Miyake et al.

(10) Patent No.: US 7,030,926 B2
(45) Date of Patent: Apr. 18, 2006

(54) IMAGE PICK-UP APPARATUS AND PORTABLE TELEPHONE UTILIZING THE SAME

(75) Inventors: Hiroyuki Miyake, Hyogo (JP); Tetsuya Kuno, Hyogo (JP); Tadashi Minobe, Hyogo (JP); Noriyuki Komori, Hyogo (JP); Hiroaki Sugiura, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 784 days.

(21) Appl. No.: 09/875,138

(22) Filed: Jun. 7, 2001

(65) Prior Publication Data

US 2002/0057344 A1 May 16, 2002

(30) Foreign Application Priority Data

Jun. 22, 2000 (JP) .............................. 2000-187166

(51) Int. Cl.
*H04N 7/14* (2006.01)
*H04N 13/02* (2006.01)
*H04N 3/14* (2006.01)
*H04N 5/225* (2006.01)

(52) U.S. Cl. ..................... 348/340; 348/14.02; 348/49; 348/294; 348/374

(58) Field of Classification Search ................. 348/340, 348/294, 45, 65, 49, 218, 373–376
See application file for complete search history.

(56) References Cited

U.S. PATENT DOCUMENTS

| 4,873,572 | A |  | 10/1989 | Miyazaki et al. |
| 5,644,410 | A |  | 7/1997 | Suzuki et al. |
| 5,893,037 | A |  | 4/1999 | Reele et al. |
| 5,940,126 | A | * | 8/1999 | Kimura ...................... 348/294 |
| 6,177,950 | B1 | * | 1/2001 | Robb ....................... 348/14.01 |
| 6,248,133 | B1 | * | 6/2001 | Komobuchi et al. ........ 348/311 |
| 6,404,554 | B1 | * | 6/2002 | Lee et al. ................... 359/558 |

FOREIGN PATENT DOCUMENTS

| CN | 1208529 | 2/1999 |
| DE | 197 36 675 | 2/1999 |
| EP | 0 710 039 | 5/1996 |
| EP | 1 104 181 A2 * | 5/2001 |
| JP | 64-82860 | 3/1989 |
| JP | 1-121725 | 5/1989 |

(Continued)

OTHER PUBLICATIONS

Patent Abstracts of Japan, JP 01 121725, May 15, 1989.

(Continued)

*Primary Examiner*—David Ometz
*Assistant Examiner*—Nhan Tran
(74) *Attorney, Agent, or Firm*—Oblon, Spivak, McClelland, Maier & Neustadt, P.C.

(57) ABSTRACT

The image pick-up apparatus is one in which a first image forming lens for forming as an image on a light-receiving surface a light entering from a first direction toward the light-receiving surface of an image pick-up device and a second image forming lens for forming as an image on the light-receiving surface a light entering from a second direction different from the first direction are mounted on a lens mount, and in which optical means for changing a direction of travel of at least one of the lights entering from these different directions to a direction perpendicular to the light-receiving surface is held in the lens mount.

17 Claims, 11 Drawing Sheets

FOREIGN PATENT DOCUMENTS

| | | | |
|---|---|---|---|
| JP | 7-184102 | | 7/1995 |
| JP | 07-184102 | * | 7/1995 |
| JP | 8-24353 | | 3/1996 |
| JP | 8-181894 | | 7/1996 |
| JP | 8-205005 | | 8/1996 |
| JP | 9-83736 | | 3/1997 |
| JP | 9-135010 | | 5/1997 |
| JP | 2000-4385 | | 1/2000 |
| JP | 2000-004386 | * | 1/2000 |
| JP | 2000-4386 | | 1/2000 |
| WO | WO 93/11631 | | 6/1993 |

OTHER PUBLICATIONS

Patent Abstracts of Japan, JP 62 224047, Oct. 2, 1987.
U.S. Appl. No. 09/827,094, filed Apr. 6, 2001, pending.
U.S. Appl. No. 09/875,138, filed Jun. 7, 2001, pending.
U.S. Appl. No. 10/003,432, filed Dec. 6, 2001, pending.

* cited by examiner

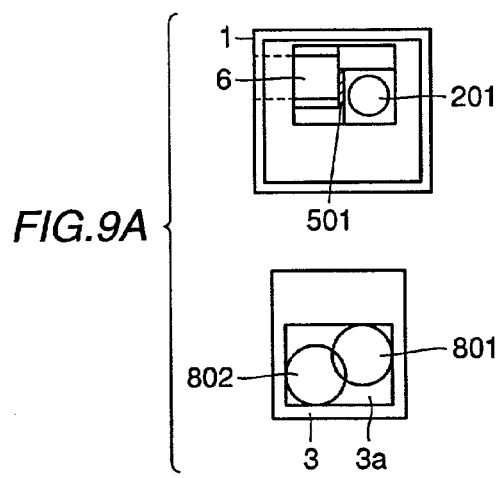
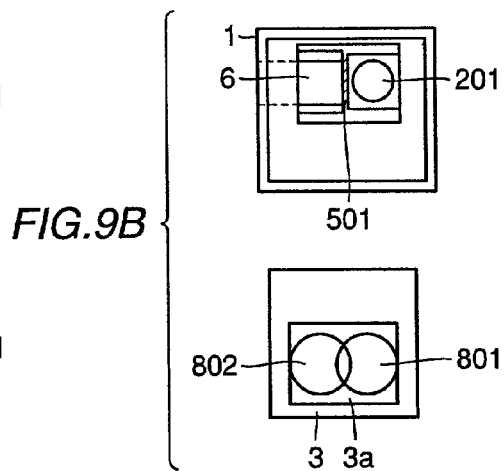
FIG.9A  FIG.9B
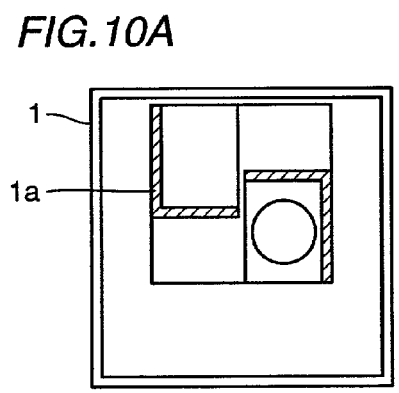
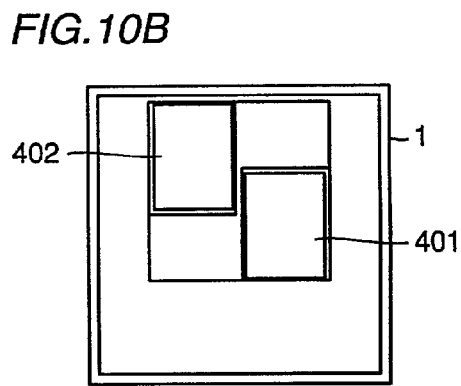
FIG.10A  FIG.10B
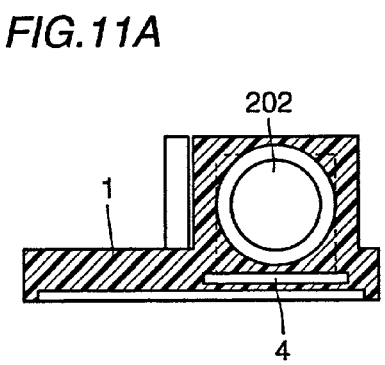
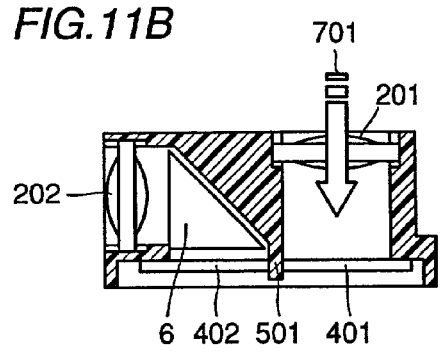
FIG.11A  FIG.11B 1f                                      1f FIG.21A
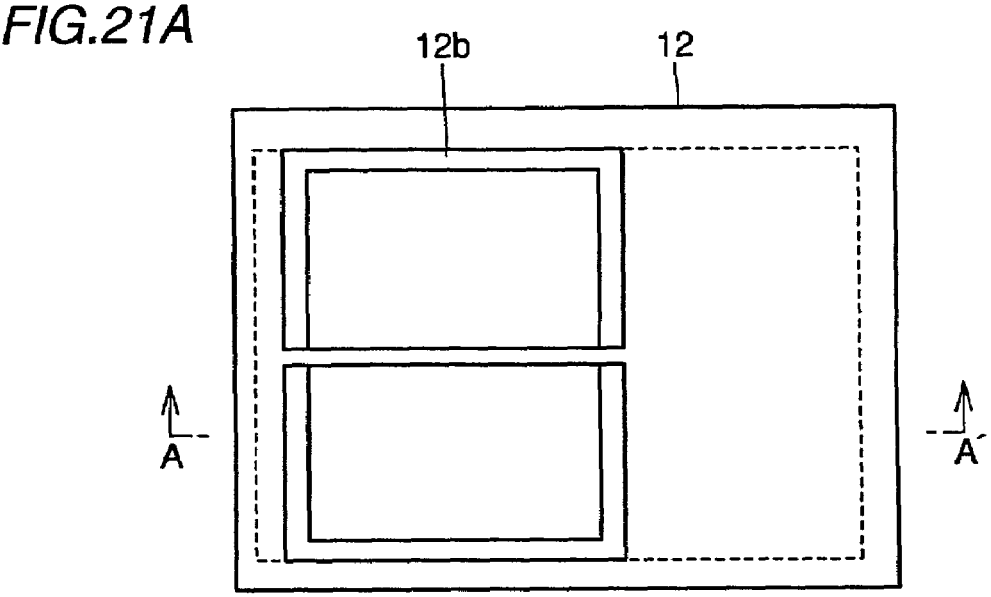
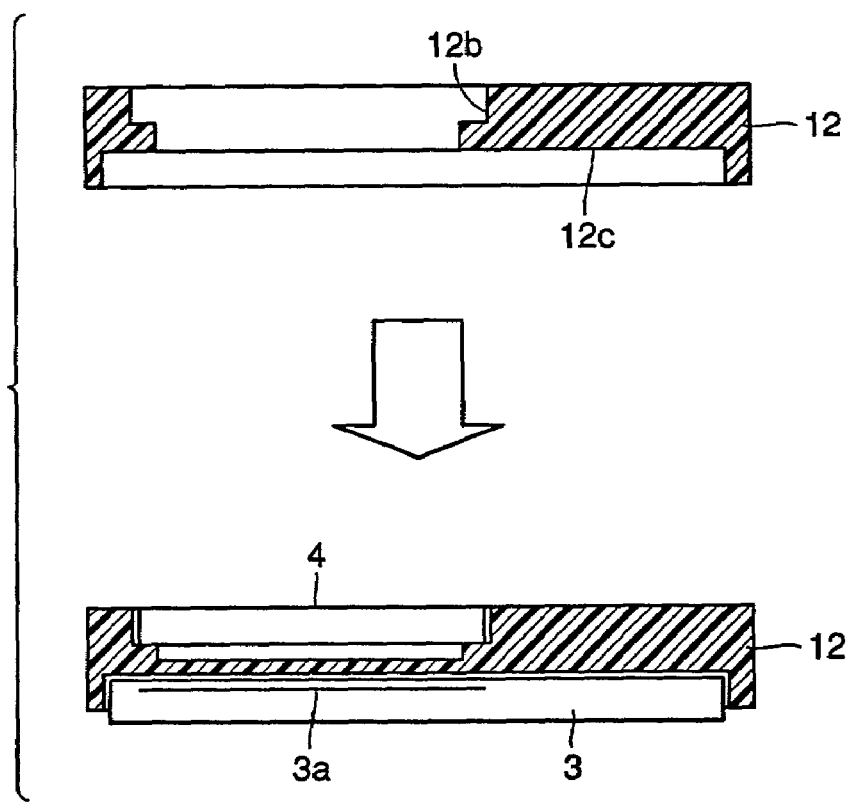
FIG.21B

IMAGE PICK-UP APPARATUS AND PORTABLE TELEPHONE UTILIZING THE SAME

BACKGROUND OF THE INVENTION

1. Field of the Invention

The present invention relates to an image pick-up apparatus for picking up object information from different directions on a light-receiving surface of one image pick-up device with a plurality of image forming lenses, and a portable telephone utilizing the image pick-up apparatus.

2. Description of the Background Art

The conventional image pick-up apparatuses of the above-mentioned type include, for instance, those having a structure shown in FIGS. 25A and 25B. FIG. 25A shows a front view and a side view of the conventional image pick-up apparatus, and FIG. 25B is a phantom diagram of the side view. As shown in FIGS. 25A and 25B the image pick-up apparatus includes an image forming lens 2, lens-barrels 101 and 102, and a package 13. Package 13 is box-like and its interior has a cavity structure, and an image pick-up device 3 having a light-receiving surface 3a is mounted in the cavity portion. Here, image pick-up device 3 is electrically connected to a circuit pattern portion integrally provided to package 13 by wire bonding packaging and the like, not shown, and further, a space in which image pick-up device 3 is disposed is sealed with a translucent plate 4. Lens-barrel 102 is fixed to package 13 using an adhesive or the like, not shown, and is assembled with lens-barrel 101 by a screw portion, not shown. Lens-barrels 101 and 102 are formed such that focus adjustment of image forming lens 2 can be performed using the screw portion, not shown. In such a conventional image pick-up apparatus, object information is condensed by image forming lens 2 and image is formed on light-receiving surface 3a portion on image pick-up device 3. The information of an object formed as image on light-receiving surface 3a is subjected to a photoelectric conversion and is output as an electrical signal.

The conventional image pick-up apparatus is configured in the above-described manner so that, in the case of a digital camera and the like, there is a need to position a monitor portion, which shows the picked-up image, on the opposite surface from the direction which the image pick-up apparatus faces in order to allow the user to confirm the condition in which the picked-up image is picked up within a monitor frame. On the other hand, in the case of a portable telephone or the like provided with an image pick-up apparatus, possible uses include transmitting and receiving a picked-up image on a communication link of the portable telephones, and two kinds of usage are possible: picking up an image of a self-portrait and transferring data thereof; and picking up an image of an object in the surroundings, for instance, an object in the opposite direction, and transferring data thereof. Thus, two kinds of usage of the image pick-up of a self-portrait and the image pick-up of the opposite direction are desirable in an image pick-up apparatus mounted on a portable telephone; however, since the conventional image pick-up apparatus can only pick up the object information from one direction as described above, it is required that the image pick-up apparatus itself be mechanically rotated to face the direction of the object to be picked up in order to allow image pick-up in both directions, i.e., image pick-up of a self-portrait and that of the opposite direction.

Portable equipment as represented by portable telephones, however, is daily subjected to extremely bad conditions of use such as dropping of the equipment and application of pressure which do not normally occur with electrical equipment. It is, therefore, not desirable to provide a mechanical operating portion such as a rotational portion on a location that is exposed on the outside from the viewpoint of structural strength. In addition, when the image pick-up apparatus is not mechanically rotated, the equipment provided with the image pick-up apparatus itself must be directed toward the object upon performing image pick-up of the opposite direction. Under this circumstance, however, the condition of the picked-up image shown on a display portion of the portable telephone cannot be confirmed so that it is difficult, for instance, to make an adjustment to locate the object in the central portion of a screen. Although the above problem is stated based on the assumption that the image pick-up apparatus is mounted in the same direction as a liquid crystal display portion of the portable telephone, it is possible to mount the image pick-up apparatus facing the opposite direction from the start. In this case, however, a similar problem occurs when attempting image pick-up of a self-portrait. In order to solve these problems, it is possible to mount a plurality of image pick-up apparatuses to effect image pick-up of both directions, but the cost would inevitably increase and it may also lead to graver problems of an enlarged form and increased weight, which are likely to degrade the commercial value of a portable equipment.

Therefore, an image pick-up apparatus has been contemplated which allows image pick-up of object information from two different directions using one image pick-up device, a beam reflecting component such as a prism mirror, and two image forming lenses, and which performs image pick-up of one of the two directions by reflecting an optical path with the prism mirror. In this case, however, it is required that an external shutter or the like switch the direction of image pick-up to either one of the two directions, or that the object information from the two directions be separated inside the image pick-up apparatus by providing a structure such as a divider plate for separating the light regions of the respective object information such that the object information from two different directions do not interfere with one another while object information from both directions are constantly being picked up. In the former case, switching of an external shutter is performed through mechanical operation by the user. A switch or the like for switching the external shutter, however, emerges on the outside of the equipment, which, like the previously described rotational structure, gives rise to the problem related to structural strength in the equipment such as a portable telephone. Moreover, in the latter case, it is difficult to realize light region separation of object information from two directions on the image pick-up device using a divider plate and the like, since the divider plate is a minute component, and assembly must be effected with high accuracy.

The present invention is made to solve the above-described problems. One object of the present invention is to provide an image pick-up apparatus that is capable of picking up images from different directions using one image pick-up device while eliminating the need to switch the image pick-up directions with an external mechanism, and a further object is to provide a portable telephone incorporating such an apparatus.

SUMMARY OF THE INVENTION

In achieving the above one object, an image pick-up apparatus according to the present invention includes an image pick-up device having a light-receiving surface, a first image forming lens for forming as an image on the light-receiving surface a first light entering from a first direction toward the light-receiving surface, a second image forming lens for forming as an image on the light-receiving surface a second light entering from a second direction different from the first direction toward the light-receiving surface, an optical member for changing a direction of travel of at least one of the first light and the second light to a direction perpendicular to the light-receiving surface, and a lens mount for holding the optical member and having the first and second image forming lenses mounted thereto.

According to the above-described invention, the first image forming lens preferably forms an image on a first light region of the light-receiving surface, the second image forming lens preferably forms an image on a second light region of the light-receiving surface, and a light region separating member is provided between the first and second light regions.

According to the above-described invention, the light region separating member preferably is continuously formed with the lens mount.

According to the above-described invention, a translucent plate for blocking at least one of infrared light and ultraviolet light preferably is provided on the light-receiving surface, and the light region separating member is fixed to the translucent plate.

According to the above-described invention, the light region separating member preferably is molded integrally with the lens mount.

According to the above-described invention, the translucent plate preferably is divided so as to sandwich the light region separating member therebetween.

According to the above-described invention, the first and second image forming lenses preferably are disposed such that the first and second light regions are located diagonally on the light-receiving surface.

According to the above-described invention, a translucent plate for blocking at least one of infrared light and ultraviolet light preferably is provided on the light-receiving surface, and the translucent plate is incorporated into the lens mount by abutting the translucent plate against an abutting portion provided on the lens mount.

According to the above-described invention, the lens mount preferably is formed of a material having a light blocking characteristic.

According to the above-described invention, the lens mount preferably forms a sealed structure for inhibiting intrusion of foreign substance onto the light-receiving surface from outside together with the first and second image forming lenses.

According to the above-described invention, a translucent plate for blocking at least one of infrared light and ultraviolet light preferably is provided on the light-receiving surface, the lens mount has a reservoir portion for an adhesive, and the translucent plate is fixed to the lens mount by providing an adhesive to the reservoir portion.

According to the above-described invention, the lens mount preferably includes a taper portion, and the taper portion is formed such that it separates optical paths from the first and second image forming lenses in a vicinity of the light-receiving surface and that it has an opening that becomes larger toward the light-receiving surface.

According to the above-described invention, the image pick-up device preferably is abutted against and fixed to the lens mount, and a reference plane for allowing at least one of the first and second image forming lenses to form an image on the light-receiving surface is formed in a portion where the image pick-up device abuts against the lens mount.

According to the above-described invention, the lens mount preferably has a box-like depressed portion on a bottom surface, the image pick-up device is fixed within the depressed portion, and a gap of the depressed portion is filled with sealing resin.

According to the above-described invention, the lens mount and the image pick-up device preferably are connected via a frame-like component, and the frame-like component has a divider portion for dividing optical paths from the first and second image forming lenses and has a translucent plate for blocking at least one of infrared light and ultraviolet light in each of the optical paths divided by the divider portion.

According to the above-described invention, an abutting surface for allowing parallel disposition of the translucent plate and the image pick-up device is preferably formed on the frame-like component.

According to the above-described invention, the frame-like component preferably has a positioning stopper, and the lens mount has a portion that is stopped by the stopper.

In addition, in achieving the above further object, a portable telephone according to the present invention incorporates one of the above-described image pick-up devices.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9A shows a back view of one example of a lens mount of the image pick-up apparatus and a front view of an image pick-up device according to the second embodiment of the present invention.

FIG. 9B shows a back view of another example of a lens mount of the image pick-up apparatus and a front view of the image pick-up device according to the second embodiment of the present invention.

FIG. 10A is a back view of a lens mount of an image pick-up apparatus according to a third embodiment of the present invention.

FIG. 10B is an explanatory diagram showing the lens mount, with a translucent plate incorporated therein, of the image pick-up apparatus according to the third embodiment of the present invention.

FIG. 11A is a phantom diagram, seen from a side, of the lens mount of the image pick-up apparatus according to the third embodiment of the present invention.

FIG. 11B is a cross sectional view, seen from a side, of the lens mount of the image pick-up apparatus according to the third embodiment of the present invention.

FIG. 21A is a front view showing a frame-like component of the image pick-up apparatus according to the eighth embodiment of the present invention.

FIG. 21B shows, above an arrow, a cross sectional view representing the frame-like component of the image pick-up apparatus according to the eighth embodiment of the present invention and, below the arrow, a cross sectional block diagram representing the frame-like component with a translucent plate, an image pick-up device and the like incorporated therein.

DESCRIPTION OF THE PREFERRED EMBODIMENTS

First Embodiment

Figure 1:
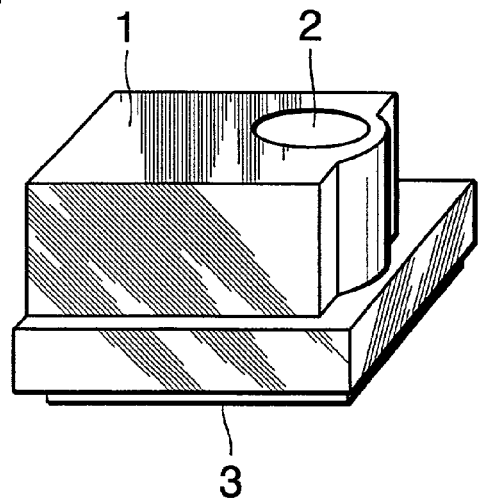
FIG. 1 is a perspective view of an image pick-up apparatus according to a first embodiment of the present invention.
Figure 2:
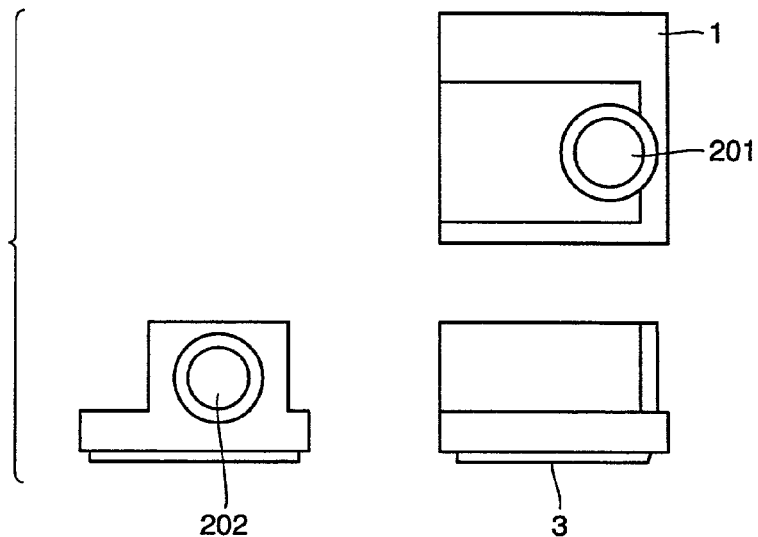
FIG. 2 is a development diagram of the image pick-up apparatus according to the first embodiment of the present invention.
Figure 3A:
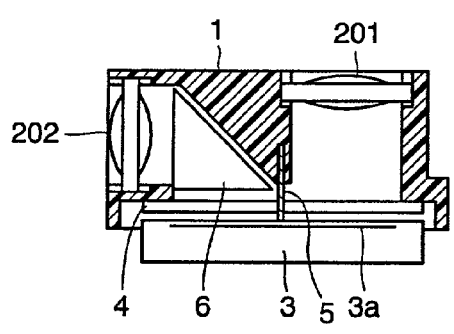
FIGS. 3A and 3B are cross sectional block diagrams of the image pick-up apparatus according to the first embodiment of the present invention.
Figure 3B:
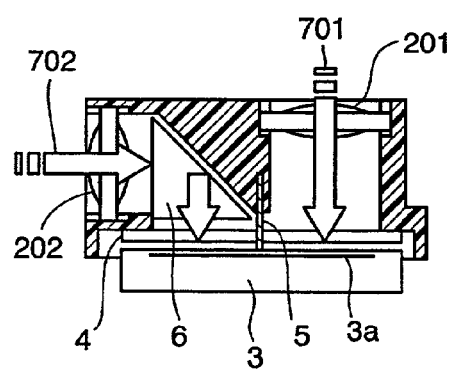

The first embodiment of the present invention will be described below with reference to FIGS. 1, 2A, 2B, and 2C. FIGS. 1 and 2, respectively, are a perspective view of an image pick-up apparatus according to the present invention and a development diagram of an exterior portion thereof. In FIGS. 1 and 2, the image pick-up apparatus includes a lens mount 1, an image forming lens 2 incorporated into lens mount 1, image forming lenses 201, 202 for picking up images from different directions, and an image pickup device 3. Here, an internal structure and an operating principle of the image pick-up apparatus according to the present invention will be described with reference to FIGS. 3A and 3B. FIGS. 3A and 3B are cross sectional block diagrams of the image pick-up apparatus according to the present invention. As shown in FIGS. 3A and 3B, the image pick-up apparatus includes lens mount 1, image pick-up device 3, a prism mirror 6, an image forming lens 201 for picking up an image in a direction of the normal to image pick-up device 3, an image forming lens 202 for picking up an image in a horizontal direction to image pick-up device 3 via prism mirror 6, a light-receiving surface 3a formed on image pick-up device 3, a translucent plate 4, and a divider plate 5 for separating light regions of optical information from different directions obtained from image forming lens 201 and image forming lens 202. FIG. 3B shows an optical path 701 in a direction of the normal from image forming lens 201 and an optical path 702 from a horizontal direction from image forming lens 202.

Figures 4A, 4B, 4C:
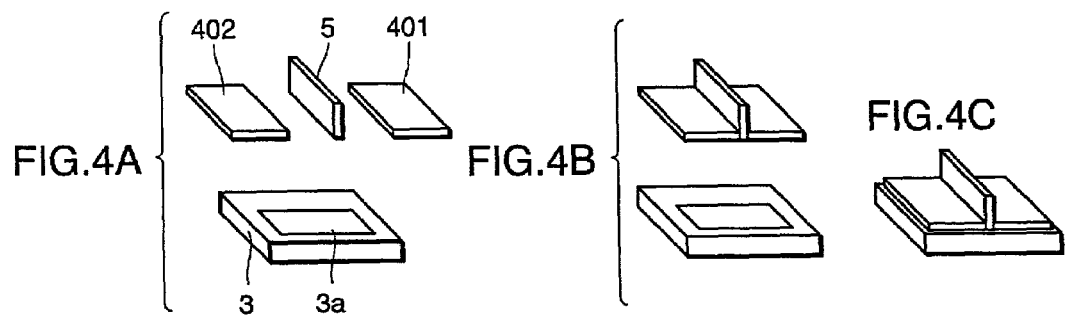
FIGS. 4A to 4C are explanatory diagrams related to the description of a step of inserting a divider plate in between divided translucent plate in the image pick-up apparatus according to the first embodiment of the present invention.

As shown in FIG. 3B, object information from the horizontal direction is reflected by prism mirror 6 and is formed as image on light-receiving surface 3a on image pick-up device 3. At this time, luminous flux of optical path 701 and luminous flux of optical path 702 do not interfere with one another since divider plate 5 separates the light regions. In addition, while the optical information formed as image on image pick-up device 3 is subjected to a photoelectric conversion on light-receiving surface 3a and is output to the outside as an electrical signal, possible methods of electrical connection between an electrical circuit portion and image pick-up device 3 include wire bonding method, flip chip bonding method, and the like. FIGS. 4A, 4B, and 4C are explanatory diagrams related to the description of a step of inserting divider plate 5 in between translucent plates 401 and 402 formed by two-part division and disposing them on light-receiving surface 3a of image pick-up device 3. As shown in FIGS. 4A, 4B, and 4C, in this order, translucent plates 401 and 402 are formed by division and divider plate 5 is sandwiched between translucent plates 401 and 402 formed by division.

When the image pick-up apparatus of the present invention is mounted on such equipment as a portable telephone, it is desirable that a mechanical external shutter mechanism is not provided in view of a structural strength requirement of such equipment. Therefore, switching of image forming lenses with an external shutter is not performed, and object information via image forming lenses 201 and 202 are constantly formed as images on image pick-up device 3. Through processing done by the equipment such as a portable telephone, however, switching between optical information to be shown on a liquid crystal monitor of the portable telephone is effected by a software, and the optical information is selected through a user key operation and the like.

Figure 5:
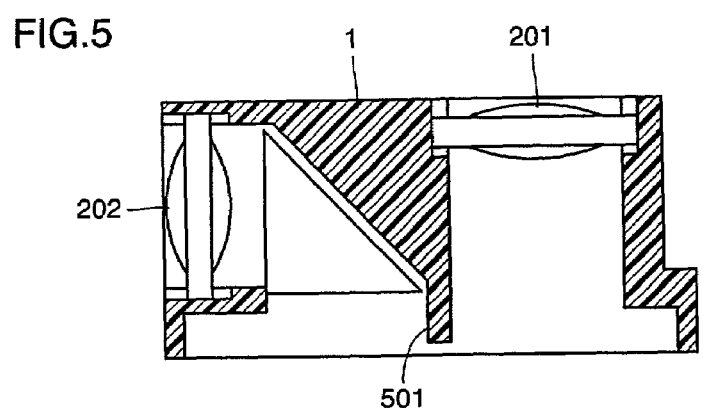
FIG. 5 is a cross sectional block diagram related to the description of an arrangement of a lens mount in the image pick-up apparatus according to the first embodiment of the present invention.
Figures 6A, 6B:
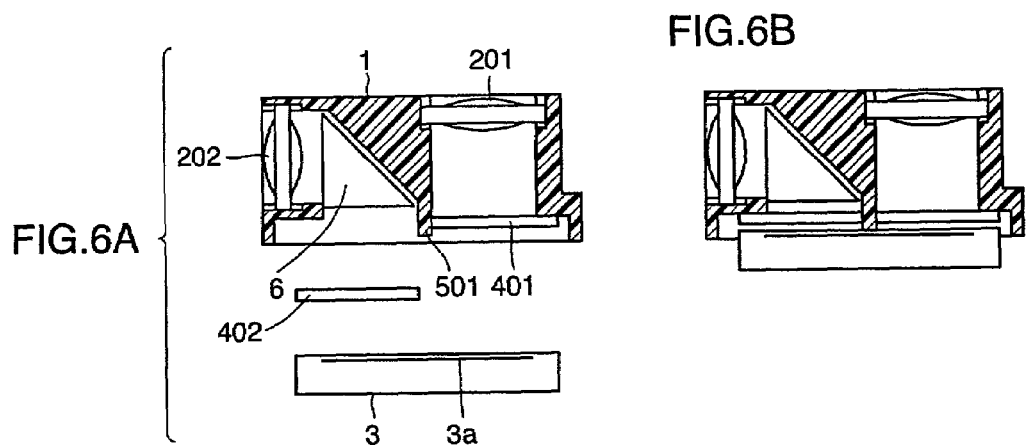
FIG. 6A is a cross sectional block diagram showing the image pick-up apparatus according to the first embodiment of the present invention prior to providing a lens mount.
FIG. 6B is a cross sectional block diagram showing the image pick-up apparatus according to the first embodiment of the present invention after providing the lens mount.

In the above, the principle of the image pick-up apparatus in which divider plate 5 separates the light regions and which is capable of image pick-up from at least two directions using one image pick-up device 3 and at least two image forming lenses 201 and 202 has been described. Since a light beam does not enter into a region in which divider plate 5 overlaps with light-receiving surface 3a of image pick-up device 3, this region cannot be used as an effective light-receiving region so that it is desirable that the thickness of divider plate 5 is as thin as possible. If, however, divider plate 5 is formed as a minute, thin component, the arrangement shown in FIGS. 4A, 4B and 4C would, in turn, suffer degradation in productivity. FIG. 5 is a cross sectional block diagram related to the description of an arrangement of a lens mount incorporating image forming lenses 201 and 202 in the image pick-up apparatus according to the present invention. As shown in FIG. 5, a divider plate portion 501 is integrally formed by connecting divider plate 5 shown in FIG. 4 with lens mount 1. It is possible to mold divider plate portion 501 to have a thickness that is as thin as 0.1 mm to 0.2 mm. Moreover, FIGS. 6A and 6B are cross sectional block diagrams showing image pick-up device 3 of the image pick-up apparatus according to the present invention prior mounting image pick-up device 3 on a lens mount and after mounting image pick-up device 3 on the lens mount, respectively. As shown in FIGS. 6A and 6B in order, image pick-up device 3 is assembled by disposing translucent plates 401 and 402 formed by division which correspond to optical paths by image forming lenses 201 and 202 such that they sandwich divider plate portion 501 of lens mount 1.

As described above, according to the image pick-up apparatus of the first embodiment, divider plate portion 501 which is a light region separating member is integrally molded with lens mount 1 so that assembly, for instance, of a two-direction image pick-up apparatus becomes easy and productivity can be improved. Moreover, lens mount 1 is a molded part, and as long as its molding material has a light blocking characteristic, has low thermal expansion coefficient, is shock-resistant, has low hygroscopicity, and has a magnetic shielding function and the like, the image pick-up apparatus can be operated with stable performance even in the operating environment of portable equipment when lens mount 1 is mounted on such equipment as a portable telephone. Furthermore, translucent plate 4 can be a component having optical characteristics that allows blocking of an infrared light range or ultraviolet rays, or that allows improved light transmittance. In this way, since a need for separate provision of such optical functional components can be eliminated, the number of components and the production manhours can be reduced, while at the same time, the image pick-up apparatus can be built in a smaller scale while having the functions of such optical characteristics.

Second Embodiment

Figure 7A:
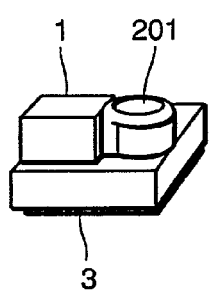
FIG. 7A is a perspective view of an image pick-up apparatus according to a second embodiment of the present invention.
Figure 7B:
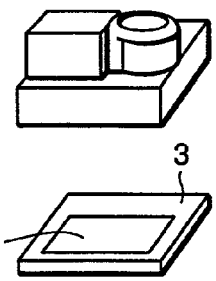
FIG. 7B is an exploded view of the image pick-up apparatus according to the second embodiment of the present invention.
Figure 7C:
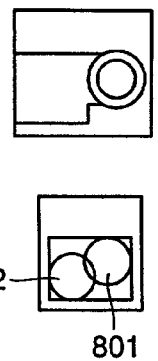
FIG. 7C shows the front views of a lens mount and an image pick-up device according to the second embodiment of the present invention.
Figure 8A:
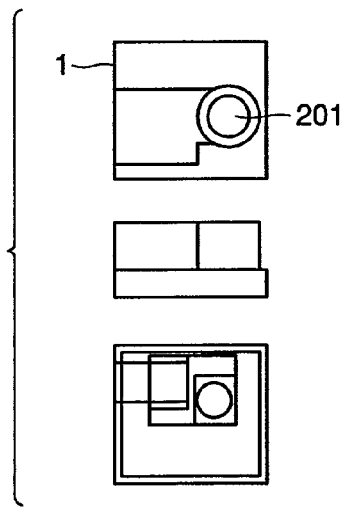
FIG. 8A shows a front view, side view, and a back view of the lens mount of the image pick-up apparatus according to the second embodiment of the present invention.
Figure 8B:
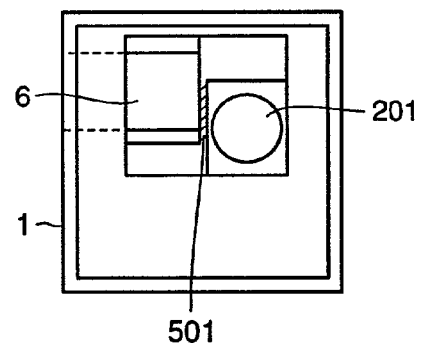
FIG. 8B is an enlarged view of the back view of the lens mount of the image pick-up apparatus according to the second embodiment of the present invention.

Now, the second embodiment of the present invention will be described with reference to FIGS. 7A to 9B. FIGS. 7A, 7B, and 7C are, respectively, a perspective view showing the image pick-up apparatus according to the second embodiment, a perspective view showing a lens mount 1 and an image pick-up device 3 being disassembled, and respective front views showing the disassembled lens mount 1 and image pick-up device 3. FIGS. 8A and 8B show, respectively, a front view, side view, and a back view of lens mount 1, and an enlarged view of the back view. FIGS. 9A and 9B each show a back view of lens mount 1 and a front view of image pick-up device 3. FIGS. 7A to 9B show lens mount 1, an image forming lens 201 in a direction of the normal, image pick-up device 3, and a light-receiving surface 3a provided on image pick-up device 3. Image circles 801 and 802 are image circles of object information formed as images by image forming lens 201 and an image forming lens, not shown, respectively. Image circle 801 corresponds to image forming lens 201, while image circle 802 corresponds to an image forming lens 202. A portion 501 shown as a diagonally shaded portion in FIGS. 8B, 9A, and 9B corresponds to a divider portion integrally formed with lens mount 1. In the image pick-up apparatus according to the second embodiment, as shown in FIGS. 7C and 9A, image forming lenses 201 and 202 are disposed such that image circles 801 and 802 are located diagonally on light-receiving surface 3a of image pick-up device 3. Since, in FIG. 9B, image forming lenses 201 and 202 are disposed such that image circles 801 and 802 on light-receiving surface 3a of image pick-up device 3 are located linearly, divider portion 501 of lens mount 1 need to be formed over a longer range than that shown in FIG. 9A.

In the second embodiment, divider portion 501 that is a light region separating member is integrally molded with lens mount 1. As described above, divider portion 501 is required to be formed as a thin-walled structure so that formation of divider portion 501 by molding becomes difficult when the range of the structure is long. According to the second embodiment, image forming lenses 201 and 202 are disposed such that two image circles are located diagonally on light-receiving surface 3a of image pick-up device 3 so that the range of the divider portion required to have a thin-walled structure can be made to be of a minute length, and productivity can be improved when the divider portion is integrally molded with the lens mount.

Third Embodiment

Now, the third embodiment of the present invention will be described with reference to FIGS. 10A to 11B. FIGS. 10A and 10B are, respectively, a back view of a lens mount 1 of an image pick-up apparatus according to the third embodiment and an explanatory diagram showing translucent plates 401 and 402 incorporated into lens mount 1. FIGS. 11A and 11B are a phantom diagram and a cross sectional view of lens mount 1, seen from different sides, respectively. The same reference characters as those appearing in the first and second embodiments indicate the same or corresponding parts in FIGS. 10 and 11 so that the descriptions thereof will not be repeated. FIG. 10A shows an abutting portion 1a for improving the accuracy of parallelism with which translucent plates 401 and 402 are incorporated into lens mount 1.

Since translucent plates 401 and 402 are incorporated into lens mount 1 by being abutted against abutting portions 1a, translucent plates 401 and 402 can be positioned perpendicular to an optical path 701 with high accuracy, as shown in FIG. 1B. When translucent plates 401 and 402 are disposed out of perpendicular to optical path 701, in the optical path from image forming lens 201 to image pick-up device 3, the condition of light becomes non-uniform over the entire region of the optical path owing to the relationship between the space and a translucent plate portion having different refractive indices of light, thereby causing nonuniformity of resolution in an image pick-up apparatus in some cases. In the image pick-up apparatus according to the third embodiment, however, a translucent plate is not oblique in relation to the optical path but is disposed accurately orthogonal to the optical path so that stable performance and easy assembly of the image pick-up apparatus can be achieved.

Fourth Embodiment

Figure 12A:
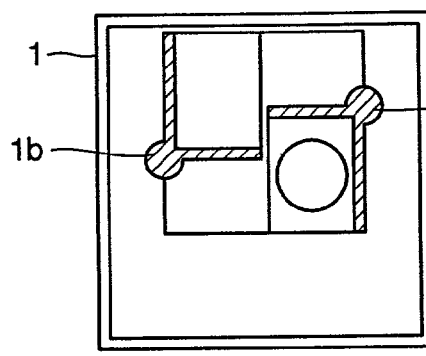
FIGS. 12A and 12B are back views of a lens mount of an image pickup apparatus according to a fourth embodiment of the present invention.
Figure 12B:
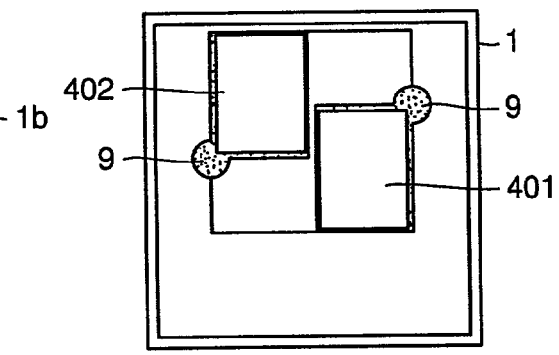
Figure 13:
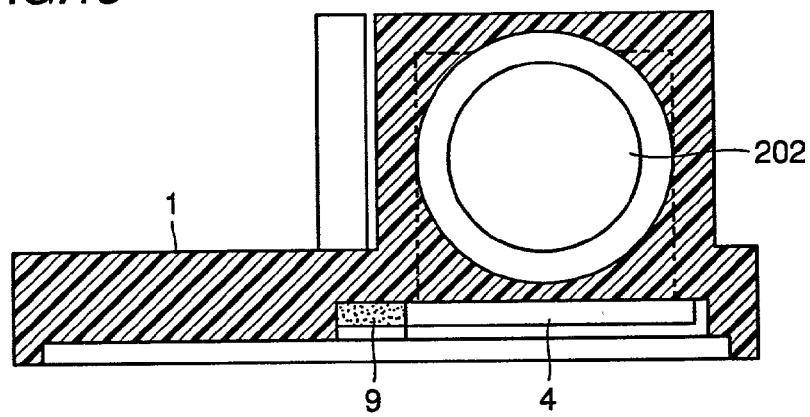
FIG. 13 is a phantom view, seen from a side, of the lens mount of the image pick-up apparatus according to the fourth embodiment of the present invention.

Now, the fourth embodiment according to the present invention will be described with reference to FIGS. 12 and 13. FIGS. 12A and 12B are back views of a lens mount 1 of the image pick-up apparatus according to the fourth embodiment, and FIG. 13 is a phantom diagram of lens mount 1, seen from a side. The same reference characters as those appearing in the third embodiment indicate the same or corresponding parts in FIGS. 12A, 12B, and 13 so that the descriptions thereof will not be repeated. In FIG. 12A, a reservoir portion 1b is a portion for collecting the adhesive for fixing by adhesion to lens mount 1 translucent plates 401 and 402 which are disposed on lens mount 1. FIG. 12B is an explanatory diagram showing translucent plates 401 and 402 disposed on lens mount 1 and adhered thereto with an adhesive 9.

In the image pick-up apparatus according to the fourth embodiment, no extra adhesive attaches to a portion of adhesion interface between a translucent plate 4 and lens mount 1 as shown in FIG. 13 and tilting of the translucent plate by the adhesive can be prevented. Thus, such problem as nonuniformity of resolution in the image pick-up apparatus due to the condition of light becoming non-uniform over the entire region of the optical path owing to the relationship between the space and a translucent plate portion having different refractive indices of light in an optical path from an image forming lens to an image pick-up device can be prevented, and stable performance and easy assembly of the image pick-up apparatus can be achieved.

Fifth Embodiment

Figure 14:
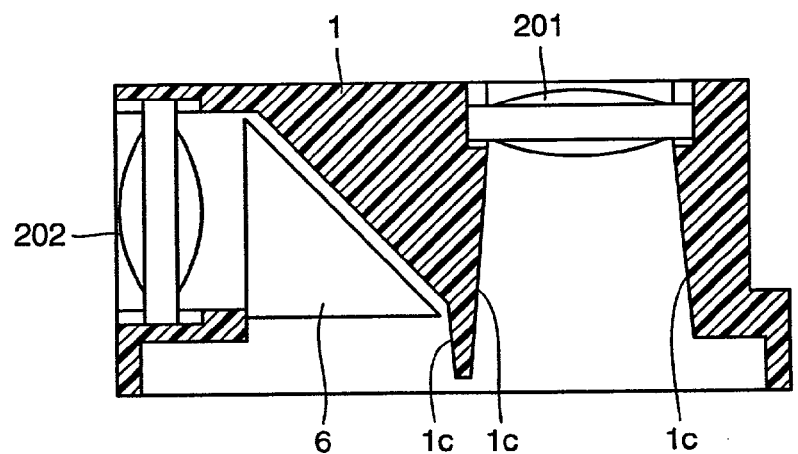
FIG. 14 is a cross sectional view of a lens mount of an image pick-up apparatus according to a fifth embodiment of the present invention.

Now, the fifth embodiment according to the present invention will be described with reference to FIG. 14. FIG. 14 is a cross sectional block diagram of a lens mount 1 of the image pick-up apparatus according to the fifth embodiment, seen from a side. The same reference characters as those in the embodiments previously described indicate the same or corresponding parts in FIG. 14 so that the descriptions thereof will not be repeated. An internal structure of lens mount 1 is formed to have a taper portion 1c, as shown in FIG. 14. Taper portion 1c is formed on a divider portion that extends toward the vicinity of a light-receiving surface such that the light region of the light-receiving surface is divided into two parts. In other words, in the optical path from image forming lens 201 to the image pick-up device, taper portion 1c is formed such that an opening toward image forming lens 201 becomes small while an opening toward the image pick-up device becomes large, whereas, in the optical path where light entering from image forming lens 202 is refracted on a prism mirror 6 such that the light enters in a direction orthogonal to the image pick-up device and leads up to the image pick-up device, taper portion 1c is formed such that an opening toward image forming lens 202 becomes small while an opening toward the image pick-up device becomes large.

In this manner, in the image pick-up apparatus according to the fifth embodiment, taper portion 1c is formed inside lens mount 1 so that, when molding lens mount 1, lens mount 1 which is a molded part can be easily released from a molding die, thereby allowing for easy molding of the divider portion which is a thin portion. In addition, since taper portion 1c is formed inside lens mount 1, it becomes possible to form the inner wall portion of lens mount 1 to have a "rough surface" using the molding die so that diffuse reflection of light within lens mount 1 as well as degradation in quality such as flare of the image pick-up apparatus can be prevented.

Sixth Embodiment

Figure 15:
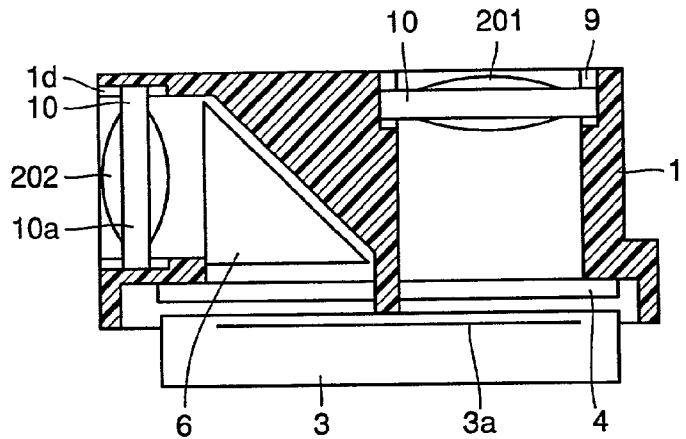
FIG. 15 is a cross sectional view of an image pick-up apparatus, seen from a side, according to a sixth embodiment of the present invention.
Figure 16:
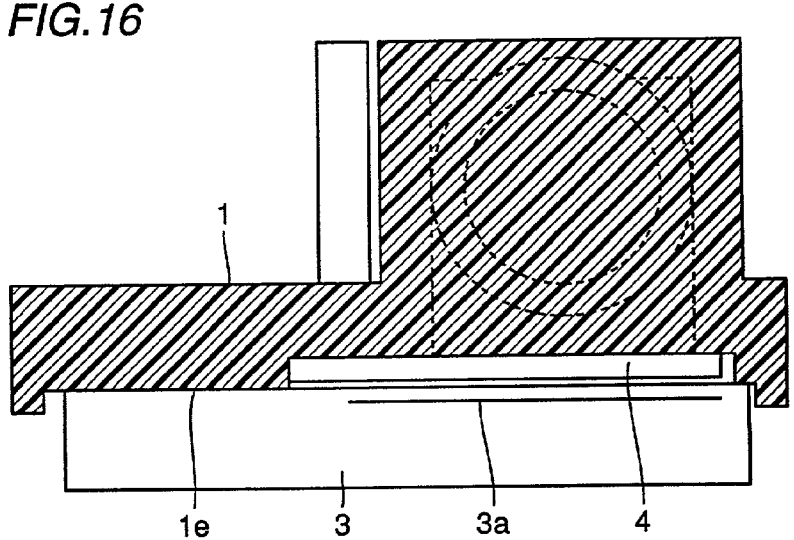
FIG. 16 is a phantom view of an image pick-up apparatus, seen from a side, according to the sixth embodiment of the present invention.

Now, the sixth embodiment of the present invention will be described with reference to FIGS. 15 and 16. FIGS. 15 is a cross sectional view of the image pick-up apparatus according to the sixth embodiment, seen from a side. FIG. 16 is a phantom view seen from the right side of FIG. 15. In FIGS. 15 and 16, lens holders 10 are used in combination with image forming lenses 201 and 202. A screw portion 1d provided on a lens mount 1 and a screw portion 10a provided on a lens holder 10 are shown. A reference portion 1e is utilized to assemble lens mount 1 and an image pick-up device 3 by abutting lens mount 1 against image pick-up device 3. Other parts denoted by the same reference characters as those in the embodiments previously described indicate the same or corresponding parts so that the descriptions thereof will not be repeated. As shown in FIG. 16, reference portion 1e of lens mount 1 is abutted against a portion other than light-receiving surface 3a of image pick-up device 3 for assembly so that lens mount 1 and image pick-up device 3 can be assembled with good relative positional accuracy in a direction of height with image pick-up device 3.

Normally, image forming lens 202 is incorporated while effecting focus adjustment by screwing screw portion 10a provided on image forming lens holder 10 into screw portion 1d provided on lens mount 1. In the sixth embodiment, however, a focus adjustment mechanism of image forming lens 201 in a direction of the normal is eliminated. In other words, screw portion 10a is not provided to lens holder 10 of image forming lens 201, and a corresponding screw portion is not provided to lens mount 1. Image forming lens 201 and lens mount 1 are integrated by adhesion in advance using adhesive 9. Since reference portion 1e of lens mount 1 and image pick-up device 3 are abutted against one another and assembled as described above, the focal point of image forming lens 201 is determined by the molding accuracy of lens mount 1. In the image pick-up apparatus according to the sixth embodiment, a focal length of a lens can be made to be 5 mm or below, and molding variation of a lens mount in the image pick-up apparatus with a lens focal length of 5 mm can be made to be ±0.01 mm or below. Thus, the focal length of lens can be of sufficient accuracy even when adhesion variation of image forming lens 201 and lens mount 1 is taken into account.

As seen from above, focus adjustment of image forming lens 201 becomes unnecessary in the image pick-up apparatus according to the sixth embodiment so that production of the image pick-up apparatus is facilitated. Although, here, the adjustment in a direction of a focal point is described as unnecessary only for image forming lens 201 in the direction of the normal, focus adjustment in a horizontal direction can also be dispensed with. In addition, adjustment of image forming lenses 201 and 202 may be performed, and adjustment mechanism for both image forming lenses 201 and 202 may be retained. Even in such a case, the relative positional relationship between lens mount 1 and image pick-up device 3 is made stable owing to the structure of abutting lens mount 1 and image pick-up device 3 against one another so that an adjustment range of image forming lenses 201 and 202 can be narrowed, which effectively reduces the time required for the adjustment.

Seventh Embodiment

Figure 17:
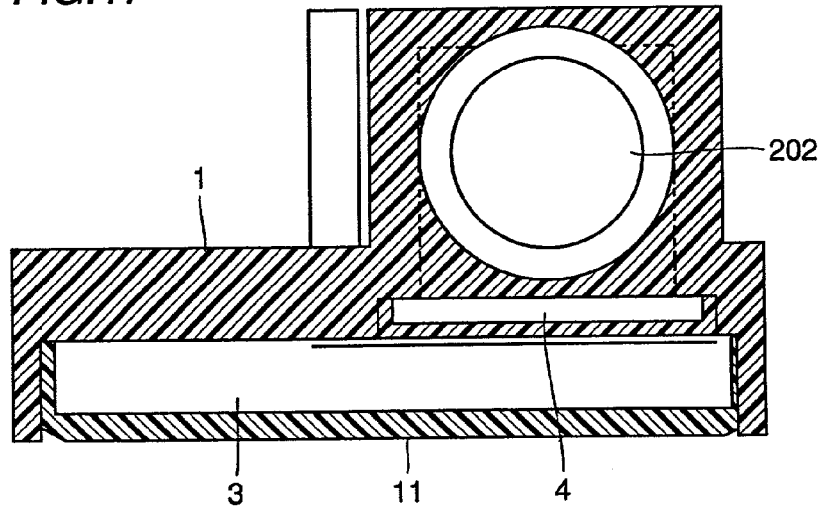
FIG. 17 is a phantom view, seen from a side, of an image pick-up apparatus according to a seventh embodiment of the present invention.
Figure 18:
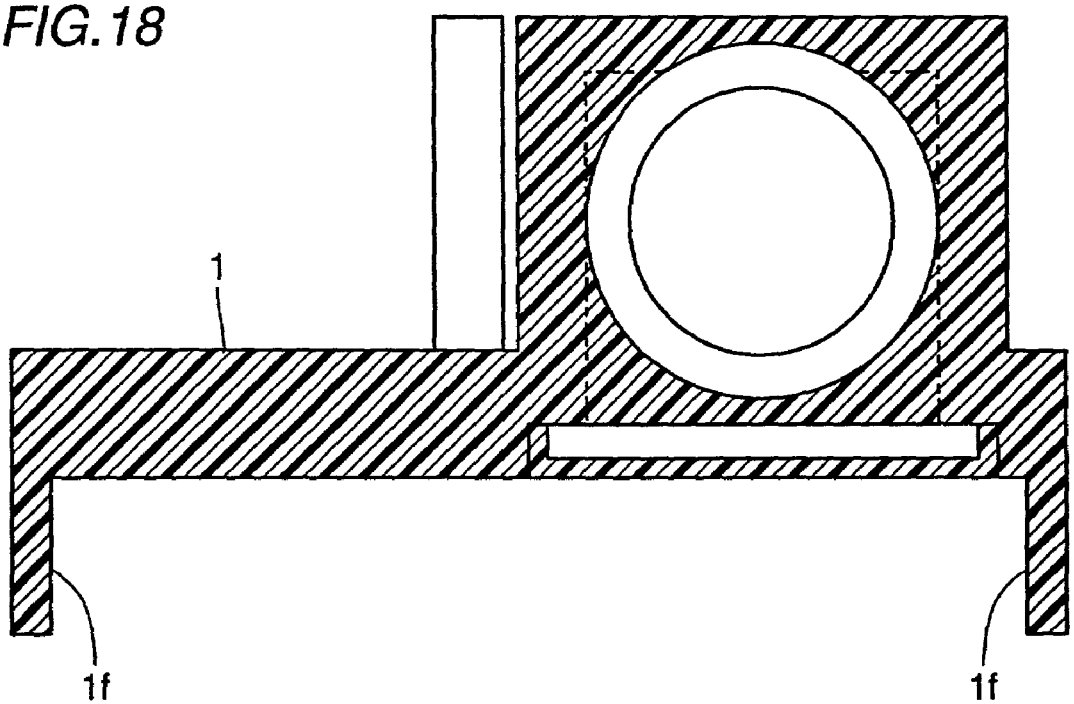
FIG. 18 is a phantom view, seen from a side, of a lens mount of the image pick-up apparatus according to the seventh embodiment of the present invention.

Now, the seventh embodiment according to the present invention will be described with reference to FIGS. 17 and 18. FIG. 17 is a phantom view, seen from a side, of the image pick-up apparatus according to the seventh embodiment. FIG. 18 is a phantom view of a lens mount 1 portion in FIG. 17, seen from a side. FIG. 18 shows two sidewall portions if provided to lens mount 1, although the two sides, not shown, orthogonal to sidewall portions 1f are formed in a similar manner. A cavity structure is formed by sidewall portions 1f formed on four sides seen from the bottom side of lens mount 1. After an image pick-up device 3 is disposed, sealing resin 11 is provided by potting or the like. Other parts denoted by the same reference characters as those in the embodiments previously described indicate the same or corresponding parts so that the descriptions thereof will not be repeated.

As described above, since a cavity is formed by sidewall portions 1f surrounding a bottom portion where image pick-up device 3 is disposed on lens mount 1, even when a liquid sealer for sealing image pick-up device 3 is provided, the liquid sealer can be prevented from flowing outward. Thus, according to the seventh embodiment, provision of a sealer 11 for sealing image pick-up device 3 portion can be facilitated, which results in improved productivity. An overflow of sealing resin 11 can be prevented, and the quality in the external appearance of the image pick-up apparatus can be improved.

Eighth Embodiment

Figure 19:
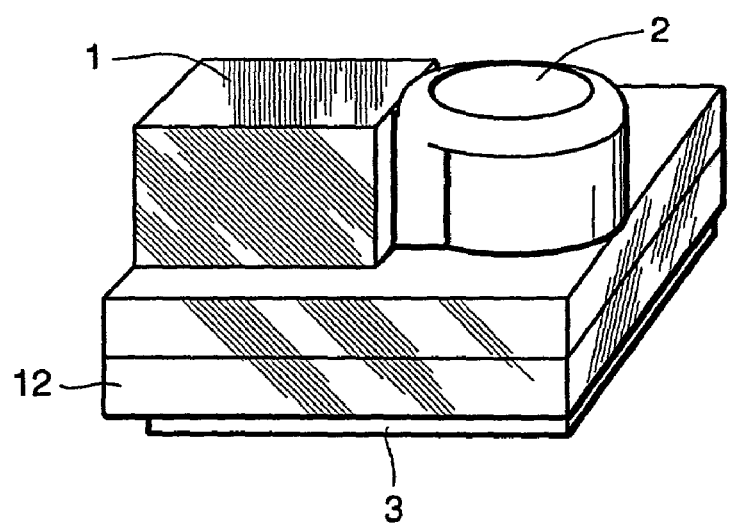
FIG. 19 is a perspective view of an image pick-up apparatus according to an eighth embodiment of the present invention.
Figure 20:
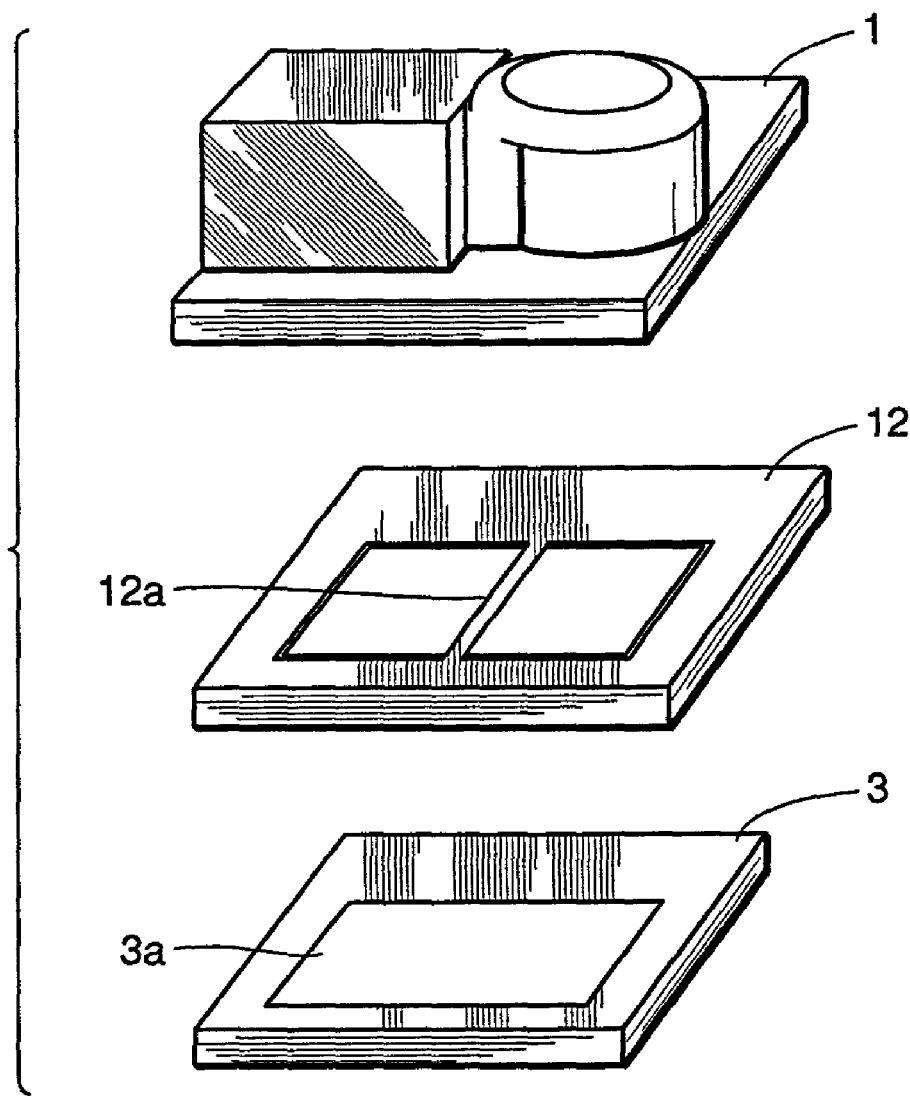
FIG. 20 is an exploded view of the image pick-up apparatus according to the eighth embodiment of the present invention.

Now, the eighth embodiment will be described with reference to FIGS. 19, 20, 21, and 22. FIG. 19 is a perspective view related to the description of the image pick-up apparatus according to the eighth embodiment. FIG. 20 is an exploded view related to the description of an arrangement of the image pick-up apparatus shown in FIG. 19. FIGS. 19 and 20 show a lens mount 1, an image forming lens 2, an image pick-up device 3, a light-receiving surface 3a formed on image pick-up device 3, a frame-like component 12, and a divider portion 12a provided in a rib-like manner to frame-like component 12. Other parts denoted by the same reference characters as those in the embodiments previously described indicate the same or corresponding parts so that the descriptions thereof will not be repeated. Here, also, two image forming lenses, not shown, are provided so as to allow two-direction image pick-up, and its operation principle is similar to as that of the above-described first embodiment.

According to the eighth embodiment, divider portion 12a which serves as a light region separating member that needs to be molded with a thin thickness is not integrally molded with lens mount 1 but is formed as a separate component on frame-like component 12 having a simple shape so that formation of divider portion 12a by molding is facilitated.

Figure 22:
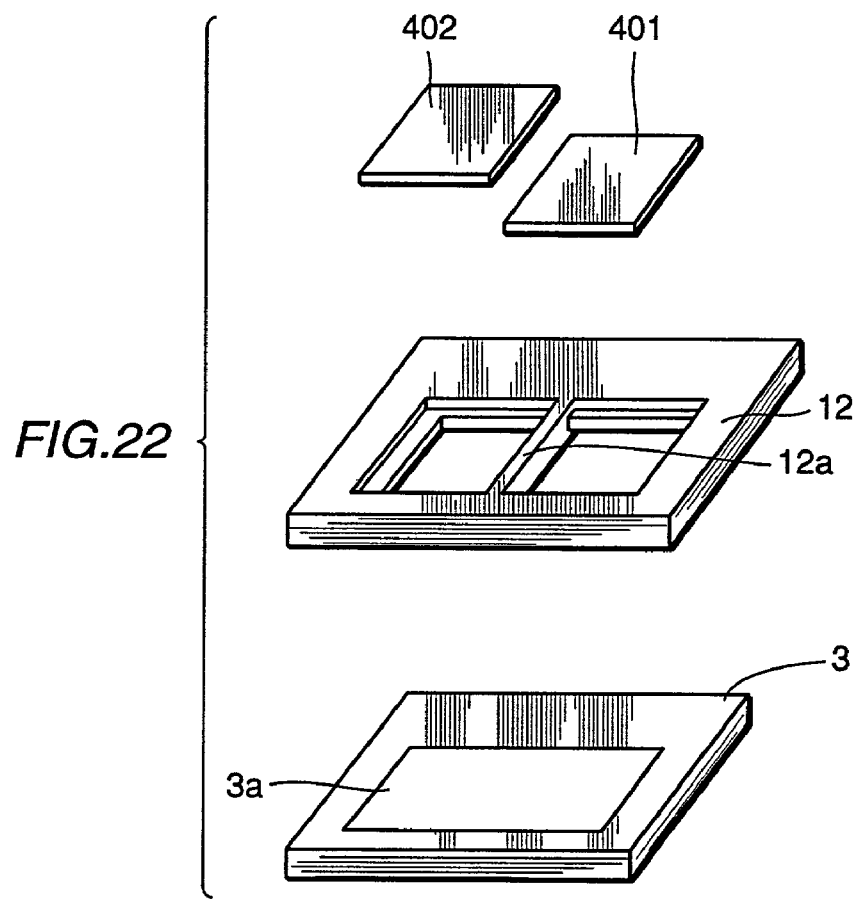
FIG. 22 is an exploded view of the image pick-up apparatus according to the eighth embodiment of the present invention.

Now, FIGS. 21A and 21B will be described. FIG. 21A is a front view of frame-like component 12. FIG. 21B shows a cross sectional view taken along the line XXIB—XXIB in FIG. 21A and, below an arrow, a cross sectional block diagram representing image pick-up device 3 incorporated into frame-like component 12. As shown in FIG. 21B, an abutting surface 12b for incorporating a translucent plate 4 in an upper portion of frame-like component 12 and an abutting surface 12c for incorporating image pick-up device 3 in a lower portion of frame-like component 12 are formed on frame-like component 12. FIG. 22 is an exploded view related to the description of positional relationships, arrangements, and so on, of translucent plate 4, frame-like component 12, and image pick-up device 3. As shown in FIG. 22, translucent plate 4 is formed by two translucent plates 401 and 402 formed by division, and incorporates divider portion 12a for light region separation in a so-called two-direction image pick-up by sandwiching divider portion 12a therebetween.

Thus, according to the eighth embodiment, translucent plates 401 and 402 disposed on frame-like component 12 and image pick-up device 3 disposed in a position opposite to translucent plates 401 and 402 are provided so that a surface portion including light-receiving surface 3a of image pick-up device 3 can be tightly sealed. Although an electrical connection member and a circuit board for operating image pick-up device 3 are not shown here, electrical connection is provided by wire bonding method, flip chip bonding method, and the like. As described above, according to the eighth embodiment, in the so-called two-direction image pick-up apparatus, configuration of divider portion 12a required for light region separation is facilitated while image pick-up device 3 can be sealed tightly so that improved reliability of the image pick-up apparatus itself can be achieved. Moreover, a surface of image pick-up device 3 having light-receiving surface 3a and translucent plate 4 can be disposed with high accuracy of parallelism according to the molding accuracy of frame-like component 12, and variation in quality of the picked-up images due to variation in parallelism of translucent plate 4 having a different refractive index from air can be alleviated. Furthermore, it is possible to handle translucent plate 4 and image pick-up device 3 already being incorporated into frame-like component 12 on a production line so that the productivity improves.

Ninth Embodiment

Figure 23:
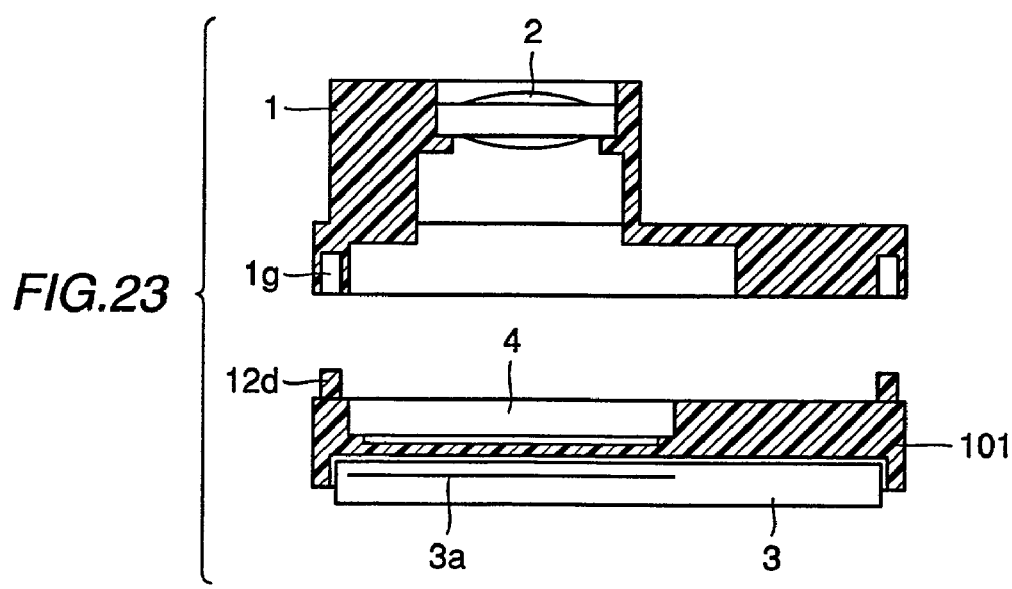
FIG. 23 is a cross sectional view, seen from a side, of an image pick-up apparatus according to a ninth embodiment of the present invention.

Now, the ninth embodiment of the present invention will be described with reference to FIG. 23. FIG. 23 is a cross sectional view of the image pick-up apparatus according to the ninth embodiment. FIG. 23 shows a protruded positioning portion 12d provided on frame-like component 12 and a depressed positioning portion 1g provided on lens mount 1. Other parts denoted by the same reference characters as those in the embodiments previously described indicate the same or corresponding parts so that the descriptions thereof will not be repeated. While divider portion 12a which is a light region separating member provided to frame-like component 12 must be disposed with high accuracy in a central portion between image circles of two image forming lenses in a two-direction image pick-up apparatus, divider portion can be easily registered with high accuracy by fitting together protruded positioning portion 12d provided on frame-like component 12 and depressed positioning portion 1g provided on lens mount 1 to assemble the image pick-up apparatus according to the ninth embodiment.

Thus, according to the ninth embodiment, registration of the positions of image circles of image forming lenses 2 with divider portion 12a which is a member separating these two light regions is facilitated so that productivity can be improved.

As described above, according to the present invention, a two-direction image pick-up apparatus that allows for mass production can be obtained by incorporating into a lens mount first and second image forming lenses for object information from different directions.

Figure 24:
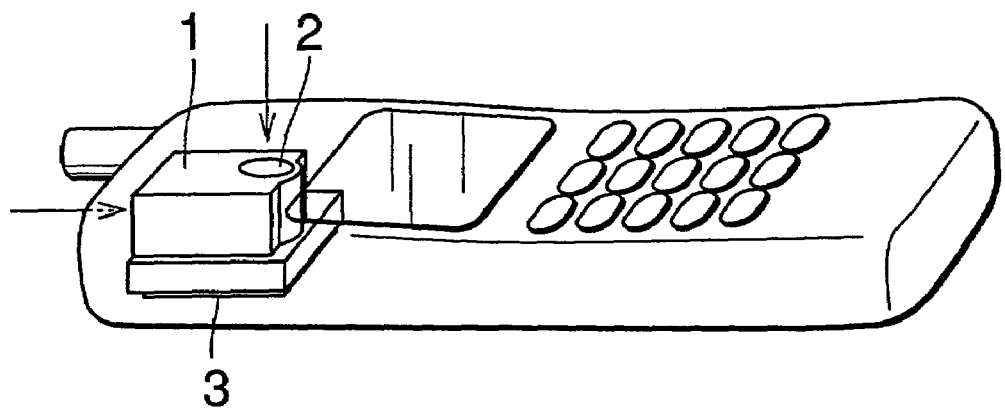
FIG. 24 is a conceptual diagram of a portable telephone incorporating an image pick-up apparatus based on the present invention.
Figure 25A:
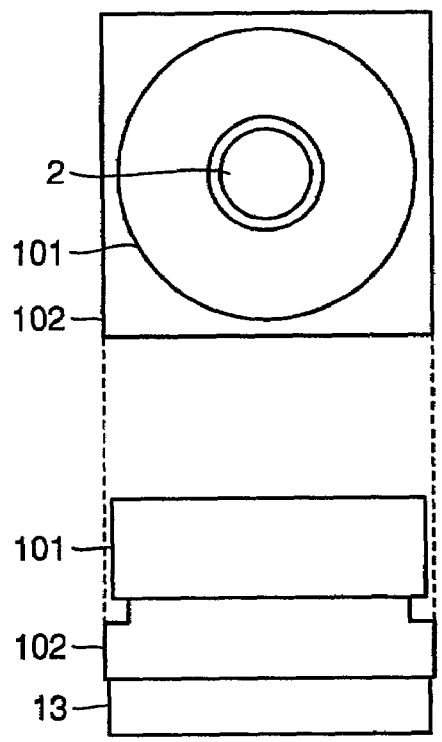
FIG. 25A shows a front view and a side view of a conventional image pick-up apparatus.
Figure 25B:
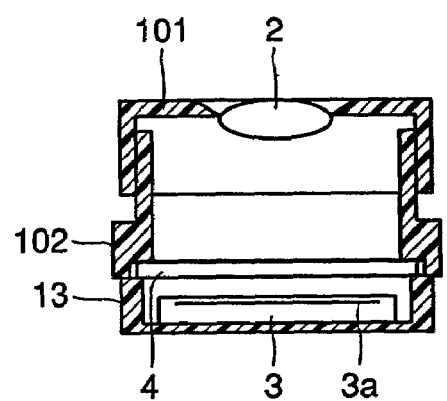
FIG. 25B is a cross sectional view of the conventional image pick-up apparatus.

In addition, when the image pick-up apparatus according to the present invention is mounted on equipment such as a portable telephone as shown in FIG. 24, two-direction image pick-up becomes possible without the use of a rotational mechanism, an external shutter, or the like so that the equipment can be built in a smaller scale, while the structural strength required for such portable equipment is ensured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pick-up apparatus, comprising:
    an image pick-up device having a light-receiving surface;
    a first image forming lens for forming as an image on said light-receiving surface a first light entering from a first direction toward said light-receiving surface, said first image forming lens forming an image on a first light region of said light-receiving surface;
    a second image forming lens for forming as an image on said light-receiving surface a second light entering from a second direction different from said first direction toward said light-receiving surface, said second image forming lens forming an image on a second light region of said light-receiving surface;
    light region separating means provided between said first and second light regions;
    optical means for changing a direction of travel of at least one of said first light and said second light to a direction perpendicular to said light-receiving surface; and
    a lens mount for holding said optical means and having said first and second image forming lenses mounted directly thereto, said light region separating means being molded integrally with said lens mount as a single element.

2. The image pick-up apparatus according to claim 1, further comprising:
    a translucent plate for blocking at least one of infrared light and ultraviolet light on said light-receiving surface, wherein said light region separating means is fixed to said translucent plate.

3. The image pick-up apparatus according to claim 2, wherein
    said translucent plate is divided so as to sandwich said light region separating means therebetween.

4. The image pick-up apparatus according to claim 1, wherein
    said first and second image forming lenses are disposed such that said first and second light regions are located diagonally relative to each other on said light-receiving surface.

5. The image pick-up apparatus according to claim 4, comprising:
    a translucent plate for blocking at least one of infrared light and ultraviolet light on said light-receiving surface, wherein said translucent plate is incorporated into said lens mount by abutting said translucent plate against an abutting portion provided on said lens mount.

6. The image pick-up apparatus according to claim 1, wherein
    said lens mount is formed of a material having a light blocking characteristic.

7. The image pick-up apparatus according to claim 1, wherein
    said lens mount forms a sealed structure for inhibiting intrusion of foreign substance onto said light-receiving surface from outside together with said first and second image forming lenses.

8. The image pick-up apparatus according to claim 1, comprising:
    a translucent plate for blocking at least one of infrared light and ultraviolet light on said light-receiving surface, wherein said lens mount has a reservoir portion for an adhesive, and said translucent plate is fixed to said lens mount by providing an adhesive to said reservoir portion.

9. The image pick-up apparatus according to claim 1, wherein
    said lens mount includes a taper portion, and said taper portion is formed such that it separates optical paths from said first and second image forming lenses in a vicinity of said light-receiving surface and that it has an opening that becomes larger toward said light-receiving surface.

10. The image pick-up apparatus according to claim 1, wherein
    said image pick-up device is abutted against and fixed to said lens mount, and a reference plane for allowing at least one of said first and second image forming lenses to form an image on said light-receiving surface is formed in a portion where said image pick-up device abuts against said lens mount.

11. The image pick-up apparatus according to claim 1, wherein
    said lens mount and said image pick-up device are connected via a frame-like component, and said frame-like component has a divider portion for dividing optical paths from said first and second image forming lenses and has a translucent plate for blocking at least one of infrared light and ultraviolet light in each of said optical paths divided by said divider portion.

12. The image pick-up apparatus according to claim 1, wherein a width of said light region separating means is 0.1 mm to 0.2 mm.

13. The image pick-up apparatus according to claim 1, wherein the first direction is substantially normal to the light-receiving surface, and the second direction is substantially parallel to the light-receiving surface.

14. A portable telephone incorporating the image pick-up apparatus according to claim 1.

15. An image pick-up apparatus, comprising:
    an image pick-up device having a light-receiving surface;
    a first image forming lens for forming as an image on said light-receiving surface a first light entering from a first direction toward said light-receiving surface, said first image forming lens forming an image on a first light region of said light-receiving surface;

a second image forming lens for forming as an image on said light-receiving surface a second light entering from a second direction different from said first direction toward said light-receiving surface, said second image forming lens forming an image on a second light region of said light-receiving surface;

light region separating means provided between said first and second light regions and having a width of 0.1 mm to 0.2 mm;

optical means for changing a direction of travel of at least one of said first light and said second light to a direction perpendicular to said light-receiving surface; and a lens mount for holding said optical means and having said first and second image forming lenses mounted directly thereto, wherein said first and second image forming lenses are disposed such that said first and second light regions are located diagonally relative to each other on said light-receiving surface.

16. The image pick-up apparatus according to claim 15, further comprising:

a translucent plate for blocking at least one of infrared light and ultraviolet light on said light-receiving surface, wherein said translucent plate is incorporated into said lens mount by abutting said translucent plate against an abutting portion provided on said lens mount.

17. The image pick-up apparatus according to claim 15, wherein the first direction is substantially normal to the light-receiving surface, and the second direction is substantially parallel to the light-receiving surface.

* * * * *